UNITED STATES PATENT OFFICE.

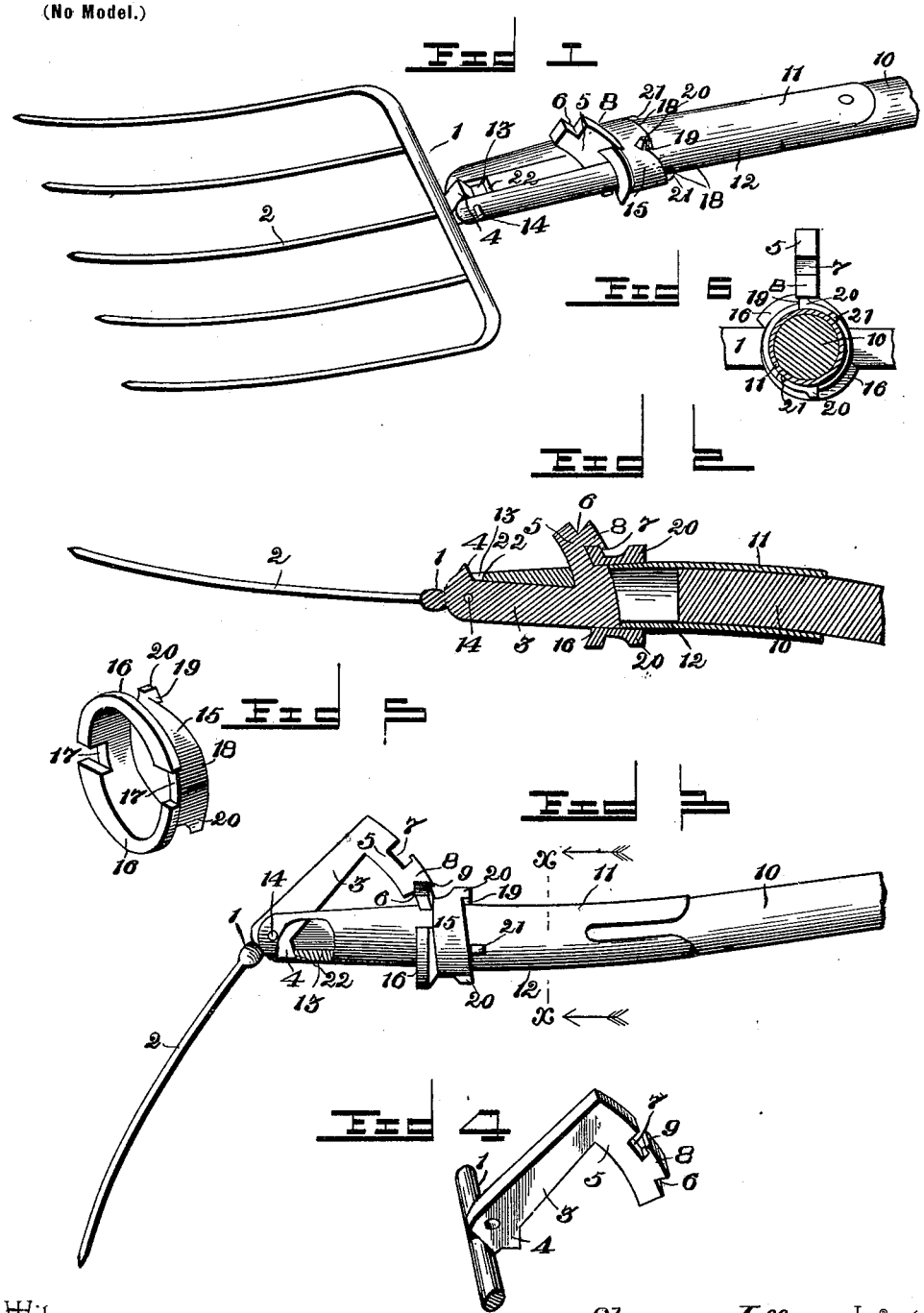

SHERMAN JEFFERY, OF MERIDEN, IOWA.

COMBINED PITCHFORK AND RAKE.

SPECIFICATION forming part of Letters Patent No. 631,166, dated August 15, 1899.

Application filed May 20, 1899. Serial No. 717,572. (No model.)

*To all whom it may concern:*

Be it known that I, SHERMAN JEFFERY, a citizen of the United States, residing at Meriden, in the county of Cherokee and State of Iowa, have invented a new and useful Combined Pitchfork and Rake, of which the following is a specification.

This invention relates to combined pitchforks and rakes, and has for its object to provide improved means whereby the tines of the implement may be adjusted transversely of the handle thereof and held either longitudinally or transversely of said handle, whereby the implement may be used as a pitchfork or a rake, as desired.

To this end the present invention consists in the combination and arrangement of parts, as will be hereinafter more fully described, shown in the accompanying drawings, and particularly pointed out in the appended claims.

In the drawings, Figure 1 is a perspective view of the implement adjusted to be used as a pitchfork. Fig. 2 is a longitudinal sectional view thereof. Fig. 3 is a side elevation showing the implement adjusted to provide a rake. Fig. 4 is a detail perspective view of the shank of the fork or rake-head. Fig. 5 is a detail perspective view of the locking cam-ring. Fig. 6 is a transverse sectional view taken on the line *x x*, Fig. 3.

Corresponding parts are designated by like reference characters in all the figures of the drawings.

Referring to the accompanying drawings, 1 designates the head of the implement, having the usual tines 2 and a flat shank 3, having a lateral shoulder 4 provided upon one edge thereof and adjacent to the head 1, and a segmental extension 5, projecting laterally at right angles to the plane of the head and at one side only of the shank. Notches 6 and 7 are provided in the outer periphery of the segmental extension 5, the notch 6 being provided at the outer or free end of the extension, and the tooth 8, formed between the two notches, is provided on its inner end with a flange or shoulder 9, extending into the notch 7 and contracting the mouth thereof. The head thus provided is adapted to be connected to the handle 10 by means of a sleeve or ferrule 11, which is provided at one end with a socket 12, to receive the end of the handle, and a longitudinal bifurcation 13 at the other end, within which the shank of the head is pivoted upon a transverse pivot-pin 14.

Mounted to turn upon the ferrule 11 at the base of the bifurcation 13 is a ring 15, having opposite peripheral cam-flanges 16, the spaced adjacent ends of the latter forming diametrically opposite notches or recesses 17, adapted to receive the segmental extension of the flat shank 3. The opposite edge of the ring is provided with the cam-faces 18, located at right angles to the cam-flanges 16, and at the respective ends of said cam-faces there are provided stop-shoulders 19 and outwardly-projecting lugs 20, forming thumb-pieces for operating the ring. Diametrically opposite lugs or shoulders 21 are provided upon the ferrule 11, and the cam-faces of the ring are adapted to work against these shoulders.

By reference to Figs. 1 and 2 it will be seen that when the implement is to be used as a pitchfork the shank of the head 1 is received entirely within the bifurcation 13, formed in the ferrule 11, and the locking-ring 15 is turned axially, so as to engage one of the cam-flanges 16 with the notch 7 in the segmental extension 5, whereby the head 1 is effectually locked against accidental movement. It will be noted that the cam-faces 18 of the locking-ring work against the lugs or shoulders 21, provided upon the ferrule, whereby said locking-ring is forced tightly against the segmental extension 5, so as to prevent accidental turning or loosening of the ring.

To adjust the head to provide a rake, as shown in Fig. 3, the locking-ring is turned to aline one of the notches or recesses 17 with the segmental extension 5 and the latter is forced transversely through the bifurcation 13 upon the pivot-pin 14 as a center until the free end of the segmental extension has passed beyond the opposite side of the ferrule. It will be noted that this position of the segmental extension is accurately provided for by reason of the stop-shoulder 4 of the shank 3 engaging with a stop-shoulder 22 provided within the bifurcation 13. Then the locking-ring 15 is turned axially to engage the opposite cam-flange 16 with the notch 6 formed in the segmental extension and the head is then locked transversely of the handle of the implement.

The construction and arrangement hereinbefore described provide a simple and durable implement, all of the parts of which are of substantial form and positively connected together and the device can be readily adjusted and effectually locked against accidental displacement in either of its adjusted positions.

Changes in the form, proportion, size, and the minor details of construction within the scope of the appended claims may be resorted to without departing from the spirit or sacrificing any of the advantages of this invention.

What I claim is—

1. In an implement of the class described, the combination with a bifurcated ferrule, of a tined head having a shank pivoted within the bifurcation and provided with a notched segmental extension, and a locking-ring mounted upon the ferrule and provided with flanges adapted to engage the notches of the segmental extension, whereby the head may be adjusted, substantially as shown and described.

2. In an implement of the class described, the combination with a ferrule having a longitudinal bifurcation and diametrically opposite lugs or shoulders provided adjacent to the base of the bifurcation, of a tined head having a shank pivoted within the bifurcation and provided with a notched lateral segmental extension and a locking-ring mounted to turn upon the ferrule and provided with flanges adapted to engage the notches of the segmental extension, and cam-faces adapted to work against the lugs or shoulders of the ferrule, whereby the flanges of the locking-ring may be forced against the segmental extension of the shank, substantially as and for the purpose set forth.

3. In an implement of the class described, the combination with a bifurcated ferrule, of a tined head having a shank pivoted within the bifurcation and provided with a notched lateral segmental extension, and a locking-ring mounted to turn upon the ferrule and provided with diametrically opposite notches or recesses adapted to aline with the bifurcation and permit of the segmental extension being adjusted transversely therethrough, and opposite flanges adapted to engage the notches of the segmental extension, whereby the head may be adjusted, substantially as shown and described.

4. In an implement of the class described, the combination with a bifurcated ferrule having a stop-shoulder provided at one side of the bifurcation, of a tined head having a shank provided with a lug or shoulder and a notched segmental extension and adapted to be pivoted within the bifurcation, and a ring mounted to turn upon the ferrule and having flanges adapted to engage with the notches of the segmental extension, the shoulder of the shank being adapted to engage the shoulder provided in the bifurcation of the ferrule in one of the adjusted positions of the head, substantially as shown and described.

5. In an implement of the class described, the combination with a bifurcated ferrule having diametrically opposite lugs or shoulders adjacent to the base of the bifurcation, of a tined head having a shank adapted to be pivoted within the bifurcation and provided with a notched segmental extension located at one side only of the shank and adapted to be adjusted transversely through the bifurcation and a locking-ring having diametrically opposite notches formed in one edge thereof, opposite cam-flanges located at opposite sides of the notches, cam-faces provided at the opposite edge of the ring and adapted to work against the lugs or shoulders provided upon the ferrule, and operating thumb-pieces adapted to engage the lugs of the ferrule and provide stops for the locking-ring, substantially as shown and described.

In testimony that I claim the foregoing as my own I have hereto affixed my signature in the presence of two witnesses.

SHERMAN JEFFERY.

Witnesses:
C. W. MOWER,
G. W. PRESCOTT.